H. C. LAWSON.
ATTACHMENT FOR OBJECT FINDERS.
APPLICATION FILED OCT. 10, 1914.

1,146,887.  Patented July 20, 1915.

WITNESSES:
C. H. Ellis
R. E. Bruckner

INVENTOR
H. C. Lawson
BY John M. Spellman
ATTORNEY

UNITED STATES PATENT OFFICE.

HARRY C. LAWSON, OF McGREGOR, TEXAS.

ATTACHMENT FOR OBJECT-FINDERS.

1,146,887.  Specification of Letters Patent.  Patented July 20, 1915.

Application filed October 10, 1914. Serial No. 866,164.

*To all whom it may concern:*

Be it known that I, HARRY C. LAWSON, a citizen of the United States, residing at McGregor, in the county of McLennan and State of Texas, have invented certain new and useful Improvements in Attachments for Object-Finders, of which the following is a specification.

My invention relates to a new and useful attachment for the object finder of a camera, and its object is to provide an attachment that will permit the object or scene about to be photographed to be viewed through a rectangular orifice, which orifice by a simple adjustment may be elongated in either of two ways, one of which will be used when the picture is taken with the film or plate elongated horizontally, and the other when the picture is taken with the film or plate vertically elongated.

A further object is to provide a device of the character described, that will be strong, durable, simple and efficient and comparatively easy to construct and one that will not be likely to get out of working order.

Figure 1:
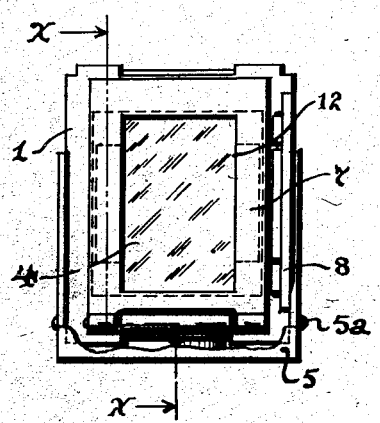
Figure 2:
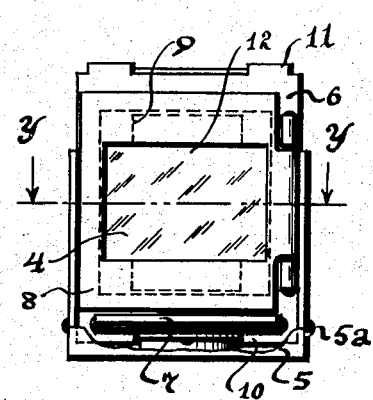
Figure 3:
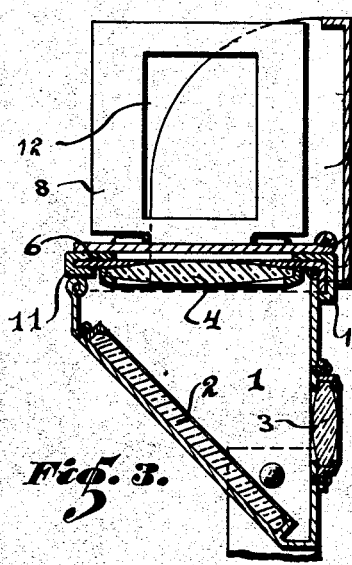
Figure 4:
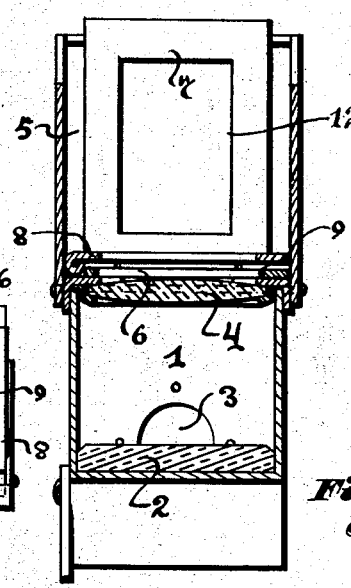
Figure 5:
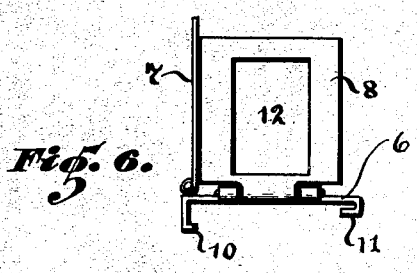
Figures 6, 7:
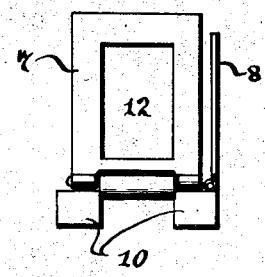

With these and various other objects in view, my invention has relation to certain novel features of the construction and use, an example of which is described in the following specification, and is illustrated in the accompanying drawing, wherein:

Figures 1 and 2 are both plan views of an object finder detached from a camera, and equipped with my attachment, the former view showing the device arranged to take a picture upon a vertically elongated film or plate, and the latter showing the adjustment when the picture is to be taken upon a horizontally elongated film or plate. Fig. 3 is a vertical section on $x$—$x$ of Fig. 1. Fig. 4 is a vertical section on $y$—$y$ of Fig. 2. Fig. 5 is a plan view of the object finder, both of the oblong plates which limit the view of the object being shown vertically disposed. Fig. 6 is a view showing in side elevation my attachment removed from the object finder. Fig. 7 is a front view of the same.

Referring now more particularly to the drawing, wherein like reference characters designate similar parts in all the figures, the numeral 1 denotes the small light box of an ordinary object finder, said box containing the usual mirror 2 inclined at an angle of substantially forty-five degrees, the front and top of the box being respectively provided with lenses 3 and 4, the former of which admits substantially horizontal rays of light to the mirror 2 from which the light reflects upward through the lens 4 to the eye. The usual hood 5 is pivoted upon the upper front portion of the box 1 upon a pintle $5^a$.

The preceding description is that of a well known and commonly used object finder. My attachment thereto primarily comprises three plates 6, 7 and 8. The plate 6 is formed with a central aperture 9 preferably somewhat larger than the exposed portion of the lens 4. Said plate is formed at its front and rear ends respectively with pairs of hooks 10 and 11, the former being somewhat larger than the latter. In applying the attachment to the object finder, the hooks 11 are first engaged with the rear edge of the top of the object finder, and the hooks 10 are then sprung downwardly to engage the downturned front edge $11^a$ of the said top.

The plates 7 and 8 are of oblong shape, and symmetrically formed with central apertures 12. A short edge of the plate 7 is hinged upon the plate 6 at the front thereof, so that when said plate 7 is swung to a horizontal position contiguous with the plate 6, the object to be photographed may be seen through a rectangular aperture as it will appear on a vertically elongated plate or portion of the film. The plate 8 has one of its longer edges in hinged connection with a lateral edge of the plate 6 so that when adjusted horizontally (or contiguous with said plate 6) the object to be photographed may be viewed as it will appear upon a horizontally elongated plate or portion of film. By using the plates 7 and 8 orificed as shown and described, the object or scene to be photographed is viewed through a rectangle proportioned as is the rectangle formed about the picture upon the film or plate, thus enabling the photographer to more accurately and perfectly space the object or scene so as to center it properly in said rectangle.

The invention is presented as including all such modifications and changes as properly come within the scope of the following claim.

What I claim is:

In a device of the character described, the combination with an object finder, of two plates hinged upon the top of the object finder, their pivotal axes forming right angles one with the other, said plates being formed with rectangular apertures of oblong shape, the longer dimensions of one of said apertures being transverse with the longer dimension of the other when both plates are in a horizontal plane.

In testimony whereof I have signed my name to this specification in the presence of two subscribing witnesses.

HARRY C. LAWSON.

Witnesses:
E. W. House,
R. R. Rulottaur.